United States Patent
Udall

(10) Patent No.: US 6,708,925 B2
(45) Date of Patent: *Mar. 23, 2004

(54) MOUNTING ARRANGEMENT FOR A GAS TURBINE ENGINE

(75) Inventor: Kenneth F Udall, Derby (GB)

(73) Assignee: Rolls-Royce plc, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/135,691

(22) Filed: May 1, 2002

(65) Prior Publication Data

US 2002/0172593 A1 Nov. 21, 2002

(30) Foreign Application Priority Data

May 19, 2001 (GB) .............................. 0112281

(51) Int. Cl.⁷ .............................. B64D 27/00
(52) U.S. Cl. .................... 244/54; 244/62; 248/554; 248/557
(58) Field of Search ................ 244/53 R, 54, 244/62; 60/797; 248/554, 556, 557

(56) References Cited

U.S. PATENT DOCUMENTS

| | | | | |
|---|---|---|---|---|
| 3,848,832 A | * | 11/1974 | Stanley et al. ............ | 244/54 |
| 4,471,609 A | * | 9/1984 | Porter et al. ............. | 60/797 |
| 4,658,579 A | * | 4/1987 | Bower et al. ............. | 60/226.1 |
| 4,875,655 A | * | 10/1989 | Bender et al. ............ | 248/557 |
| 5,028,001 A | * | 7/1991 | Bender et al. ............ | 244/54 |
| 5,065,959 A | * | 11/1991 | Bhatia et al. ............ | 244/54 |
| 5,174,525 A | * | 12/1992 | Schilling ................. | 244/54 |
| 5,320,307 A | * | 6/1994 | Spofford et al. .......... | 244/54 |
| 5,409,184 A | * | 4/1995 | Udall et al. ............. | 244/54 |
| 5,443,229 A | * | 8/1995 | O'Brien et al. ........... | 244/54 |
| 5,524,847 A | * | 6/1996 | Brodell et al. ........... | 244/54 |
| 5,746,391 A | * | 5/1998 | Rodgers et al. ........... | 244/54 |
| 5,775,638 A | * | 7/1998 | Duesler .................. | 244/54 |

FOREIGN PATENT DOCUMENTS

| | | | | |
|---|---|---|---|---|
| GB | 1328410 P | 8/1973 | | |
| GB | 2049817 | * 12/1980 | ............... | 244/54 |

* cited by examiner

*Primary Examiner*—Michael J. Carone
*Assistant Examiner*—Daniel Matz
(74) *Attorney, Agent, or Firm*—W. Warren Taltavull; Manelli, Denison & Selter pllc

(57) ABSTRACT

A mounting arrangement (46) for mounting a turbofan gas turbine engine (10) on an aircraft pylon (44). The gas turbine engine (10) comprises a core engine (24) having a core engine casing (26). The mounting (46) comprises a first mounting (48) for mounting the core engine casing (26) on the pylon (44) and a second mounting (50) for mounting the core engine casing (26) on the pylon (44). The first mounting (48) comprises a first hinge adjacent (52) the core engine casing (26) and a second hinge adjacent (54) adjacent the pylon (44). The first hinge (52) is arranged parallel to the axis (S) of the gas turbine engine (10) to form a roll hinge. The second hinge (54) is arranged in a plane perpendicular to the axis (S) of the gas turbine engine (10) to form a pitch hinge. The second mounting (50) comprises a third hinge (56) adjacent the core engine casing (26) and a fourth hinge (58) adjacent the pylon (44). The third and fourth hinges (56, 58) are arranged in a plane perpendicular to the axis (S) of the gas turbine engine (10). The hinges (52, 54, 56, 58) are elastic hinges.

17 Claims, 5 Drawing Sheets

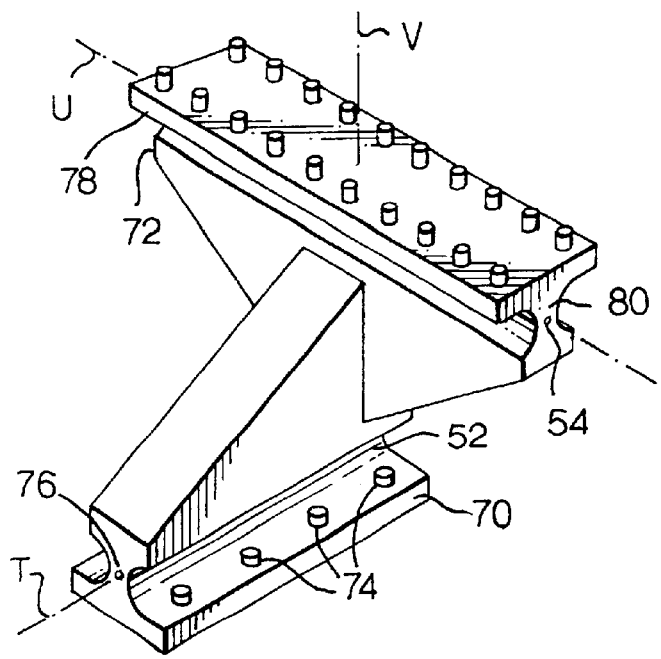
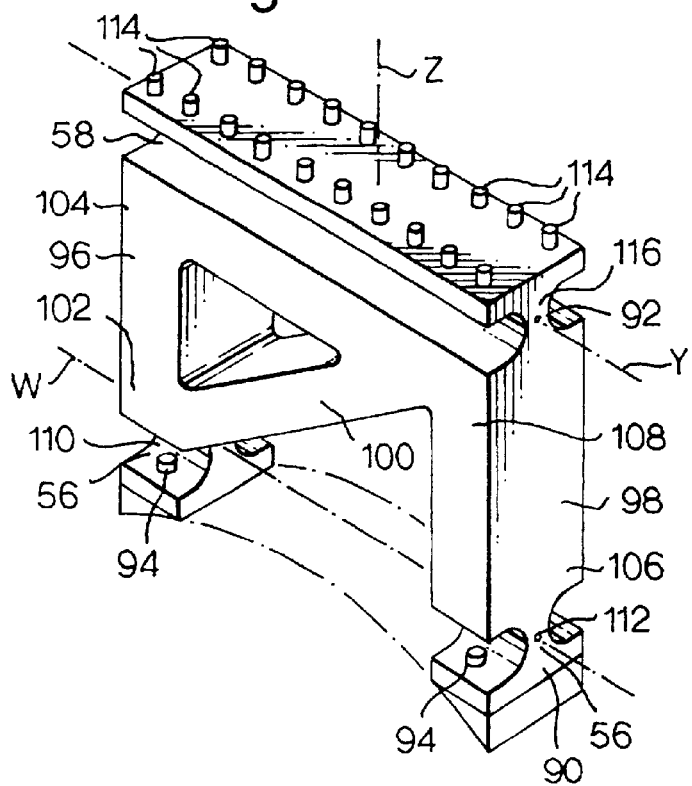

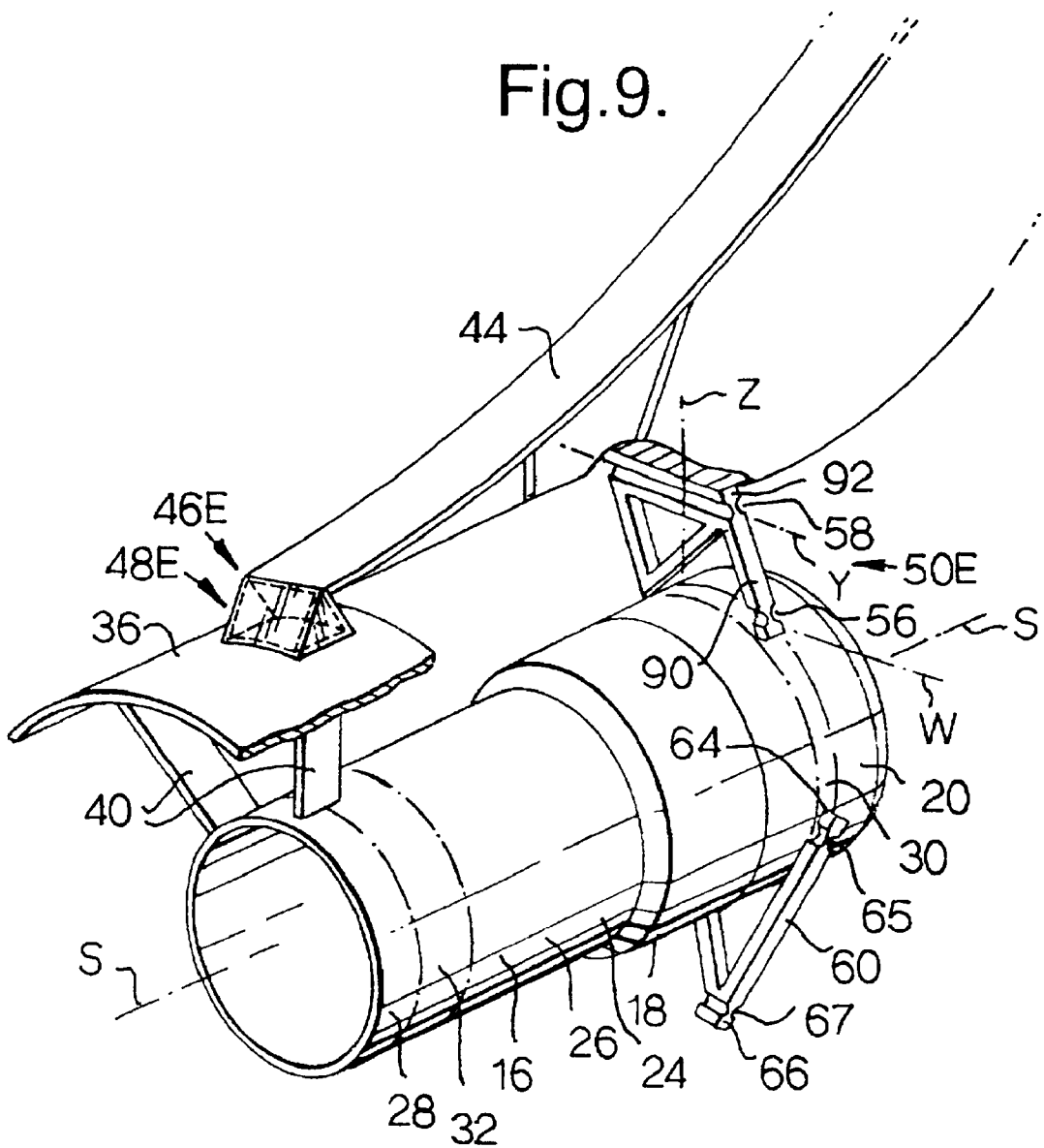

MOUNTING ARRANGEMENT FOR A GAS TURBINE ENGINE

FIELD OF THE INVENTION

The present invention relates to a mounting arrangement for mounting a gas turbine engine on an aircraft, in particular to a mounting arrangement for mounting a turbofan gas turbine engine on an aircraft.

BACKGROUND OF THE INVENTION

A turbofan gas turbine engine is commonly mounted on an aircraft pylon by a first mounting on the core engine casing and a second mounting on the core engine casing. An example of a first mounting is described in our European patent EP0613444B1 and an example of a second mounting is described in our European patent EP0431800B1. The first mounting transmits thrust loads, side loads and vertical loads to the aircraft pylon. The second mounting transmits torque loads, vertical loads and side loads to the aircraft pylon.

These gas turbine engine mountings are arranged to be statically determinate systems, i.e. six degrees of freedom restraint covering translation in the x, y and z axes with rotational constraint about each axis. The aim in these mountings is to provide one and only one means by which each degree of freedom is restrained, so that component loads may be calculated and "fights" may be avoided. Conventionally, in these mountings each degree of freedom is constrained by a system of ball ended links.

SUMMARY OF THE INVENTION

Accordingly the present invention seeks to provide a novel mounting for a gas turbine engine.

Accordingly the present invention provides a mounting arrangement for mounting a gas turbine engine on an aircraft, the gas turbine engine having at least one casing, the mounting arrangement comprises at least one mounting for mounting the at least one casing on the aircraft, the mounting comprises at least one elastic hinge arranged parallel to the axis of the gas turbine engine or at least one elastic hinge arranged in a plane perpendicular to the axis of the gas turbine engine, the at least one elastic hinge is arranged to allow small elastic movements of the mounting within the fatigue limits of the material of the mounting.

The at least one mounting may comprise a first hinge arranged parallel to the axis of the gas turbine engine and a second hinge arranged in a plane perpendicular to the axis of the gas turbine engine.

The at least one mounting may comprise a first hinge arranged parallel to the axis of the gas turbine engine, a second hinge arranged in a plane perpendicular to the axis of the gas turbine engine and a third hinge arranged in a plane perpendicular to the axis of the gas turbine engine.

The at least one mounting may comprise a first hinge arranged in a plane perpendicular to the axis of the gas turbine engine and a second hinge arranged in a plane perpendicular to the axis of the gas turbine engine.

Preferably the gas turbine engine comprises a core engine having a core engine casing, the mounting arrangement comprises a first mounting for mounting the core engine casing on the aircraft and a second mounting for mounting the core engine casing on the aircraft, the first mounting comprises a first hinge and a second hinge, the first hinge is arranged parallel to the axis of the gas turbine engine to form a roll hinge, the second hinge is arranged in a plane perpendicular to the axis of the gas turbine engine to form a pitch hinge, the second mounting comprises a third hinge adjacent the core engine casing and a fourth hinge adjacent the aircraft, the third hinge is arranged in a plane perpendicular to the axis of the gas turbine engine, the fourth hinge is arranged in a plane perpendicular to the axis of the gas turbine engine and the hinges are elastic hinges.

The first mounting may be an upstream mounting and the second mounting is a downstream mounting.

The first mounting may be a downstream mounting and the second mounting is an upstream mounting.

The upstream mounting may be adjacent an upstream bearing housing and the downstream mounting is adjacent a downstream bearing housing.

The first hinge may be adjacent the core engine casing and the second hinge is adjacent the aircraft.

The first mounting may be configured and arranged such that in operation torsion of the first mounting allows the first mounting to act as a vertical hinge.

Preferably the third and fourth hinges are parallel.

Alternatively the gas turbine engine comprises a core engine and a fan, the core engine having a core engine casing, the fan having a fan casing, the mounting arrangement comprises a first mounting for mounting the fan casing on the aircraft, a second mounting for mounting the core engine casing on the aircraft and a third mounting for mounting the core engine casing on the aircraft, the first mounting comprises a first hinge, a second hinge and a third hinge, the first hinge is arranged parallel to the axis of the gas turbine engine to form a roll hinge, the second hinge is arranged in a plane perpendicular to the axis of the gas turbine engine, the third hinge is arranged in a plane perpendicular to the axis of the gas turbine engine, the second mounting comprises a fourth hinge adjacent the core engine casing and a fifth hinge adjacent the aircraft, the fourth hinge is arranged in a plane perpendicular to the axis of the gas turbine engine, the fifth hinge is arranged in a plane perpendicular to the axis of the gas turbine engine, the third mounting comprises at least one thrust strut extending from the core engine casing to the aircraft and the hinges are elastic hinges. Preferably the second and third hinges are parallel. Preferably the fourth and fifth hinges are parallel.

Alternatively the gas turbine engine comprises a core engine and a fan, the core engine having a core engine casing, the fan having a fan casing, fan outlet guide vanes and a nacelle, the fan outlet guide vanes extending radially between the fan casing and the core engine casing, the mounting arrangement comprises a first mounting for mounting the fan casing on the aircraft and a second mounting for mounting the core engine casing on the aircraft, the first mounting comprises the fan casing and the nacelle forming a unified structure, the second mounting comprises a first hinge adjacent the core engine casing and a second hinge adjacent the aircraft, the first hinge is arranged in a plane perpendicular to the axis of the gas turbine engine, the second hinge is arranged in a plane perpendicular to the axis of the gas turbine engine and the hinges are elastic hinges. Preferably the first and second hinges are parallel.

The second mounting may be configured and arranged such that in operation differential side bending of the second mounting allows the second mounting to act as a vertical hinge.

Preferably the gas turbine engine is a turbofan gas turbine engine. Preferably the turbofan gas turbine engine comprises a nacelle arranged substantially coaxially with the core engine.

Preferably an A-frame connects the core engine casing and the nacelle, the A-frame and the second mounting are arranged in a substantially vertical plane containing the engine axis.

Preferably the A-frame is arranged at an angle such that the radially inner end of the A-frame is at a different axial position to the radially outer end of the A-frame.

Preferably the second mounting is arranged at an angle such that the radially inner end of the second mounting is at a different axial position to the radially outer end of the second mounting.

Preferably the aircraft, nacelle, first mounting and second mounting form a unified structure.

Preferably the first mounting and the second mounting are mounted on a pylon of the aircraft.

Preferably the pylon extends from the wing of the aircraft or the fuselage of the aircraft.

BRIEF DESCRIPTION OF THE DRAWINGS

The present invention will be more fully described by way of example with reference to the accompanying drawings in which:

FIG. 3 is an enlarged perspective view of the first mounting shown in FIG. 1.

FIG. 4 is an enlarged perspective view of the second mounting shown in FIG. 1.

FIG. 9 is an enlarged perspective view of the mounting arrangement shown in FIG. 8.

DETAILED DESCRIPTION OF THE INVENTION

Figure 1:
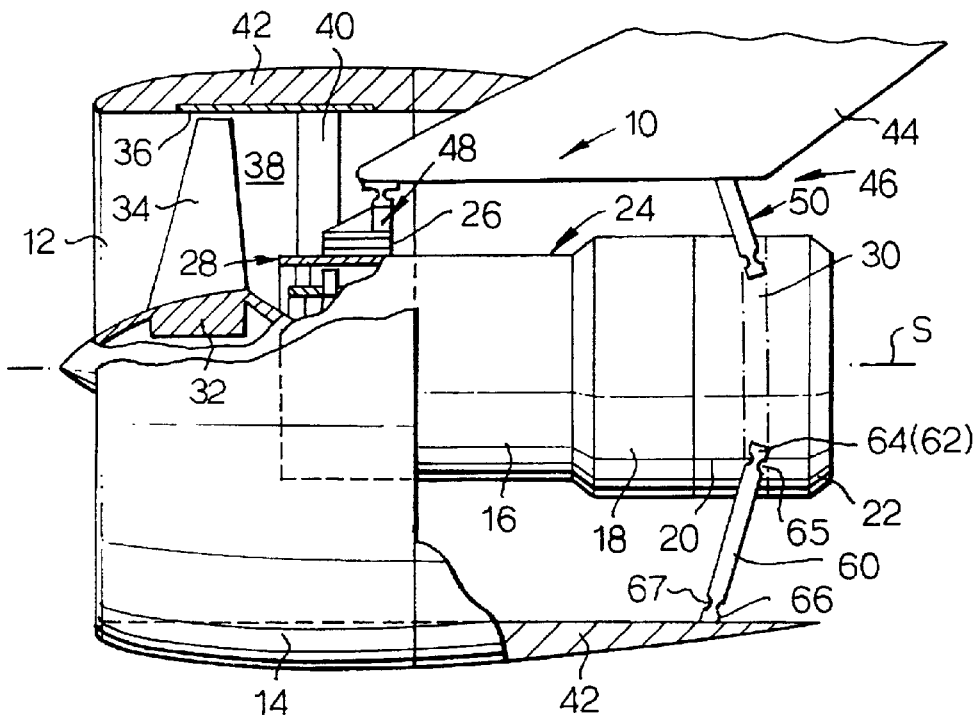
FIG. 1 shows a turbofan gas turbine engine having a mounting arrangement according to the present invention.

A turbofan gas turbine engine 10, as shown in FIG. 1, comprises in flow series an intake 12, a fan section 14, a compressor section 16, a combustion section 18, a turbine section 20 and an exhaust nozzle 22. The turbine section 20 comprises one or more turbines arranged to drive one or more compressors in the compressor section 14 via one or more shafts (not shown). The turbine section 20 comprises one or more turbines arranged to drive the fan section 14 via a shaft (not shown). The gas turbine engine 10 has an axis of rotation S.

The compressor section 16, combustion section 18 and turbine section 20 form a core engine 24 of the turbofan gas turbine engine 10. The core engine 24 has a core engine casing 26. The core engine 24 has an upstream bearing housing 28 and a downstream bearing housing 30.

The fan section 14 comprises a fan rotor 32, which carries a plurality of circumferentially spaced radially outwardly extending fan blades 34. The fan blades 34 are surrounded by a fan casing 36, which defines a fan duct 38. The fan casing 36 is secured to the core engine casing 26, adjacent the upstream bearing housing 28, by a plurality of circumferentially spaced radially extending fan outlet guide vanes 40. The fan casing 36 forms part of a nacelle 42.

Figure 2:
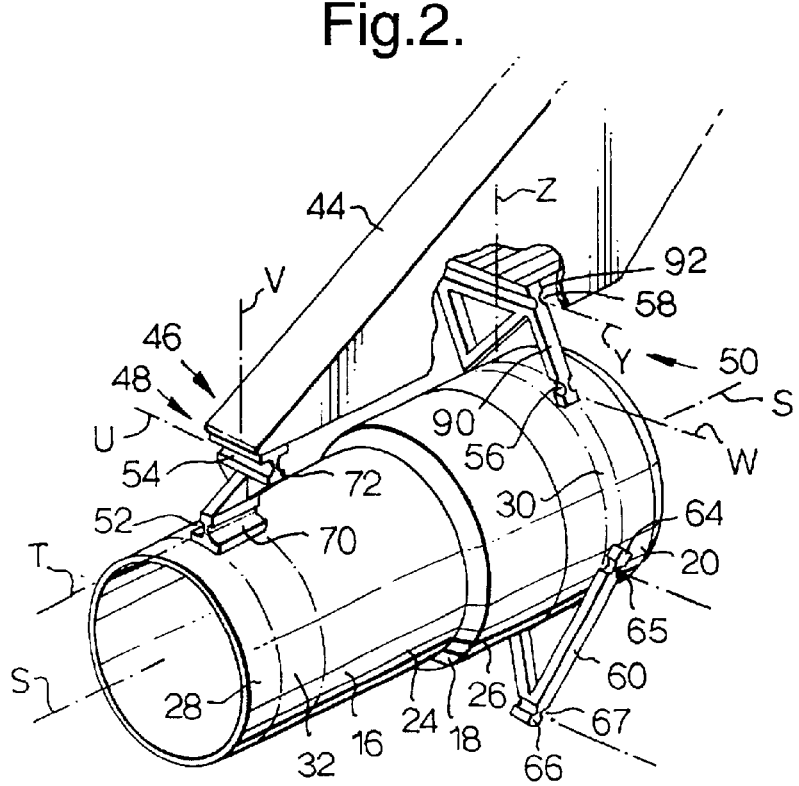
FIG. 2 is a perspective view of the mounting arrangement shown in FIG. 1.

The turbofan gas turbine engine 10 is mounted on an aircraft structure, for example the pylon 44, by a mounting arrangement 46 as shown more clearly in FIGS. 2, 3 and 4. The mounting arrangement 46 comprises a first mounting 48 and a second mounting 50. The first mounting 48 is secured to the core engine casing 26 adjacent the upstream bearing housing 28 and the second mounting 50 is secured to the core engine casing 26 adjacent the downstream bearing housing 30. The first mounting 48 and second mounting 50 are arranged in a plane containing the axis S of the turbofan gas turbine 10 and in a plane substantially vertically through the turbofan gas turbine engine 10.

The first mounting 48 comprises a first hinge 52 adjacent the core engine casing 26 and a second hinge 54 adjacent the aircraft pylon 44. The first hinge 52 has a hinge line T arranged substantially parallel to the axis S of the gas turbine engine 10 to form a roll hinge. The second hinge 54 has a hinge line U arranged in a plane substantially perpendicular to the axis S of the gas turbine engine 10 to form a pitch hinge. The hinge line U is arranged substantially perpendicularly to the plane substantially vertically through the turbofan gas turbine engine 10. The first mounting 48 is configured and arranged so that it comprises an open section of low torsional stiffness between the first hinge 52 and the second hinge 54 such that in operation torsion of the first mounting 48 allows the first mounting 48 to act as a vertical, yaw, hinge around hinge line V. The first hinge 52 and the second hinge 54 are elastic hinges. Thus in operation the first mounting 48 transmits vertical loads, side loads and thrust loads from the core engine casing 26 to the aircraft pylon 44.

The first mounting 48, as shown in FIG. 3, comprises a first end portion 70 and a second end portion 72. The first end portion 70 is secured to the core engine casing 26 by fasteners 74, for example a bolted fastening or by welding, bonding, diffusion bonding etc. The first end portion 70 extends radially from and axially along the core engine casing 26. The first end portion 70 extends a greater distance in the axial direction than the circumferential direction. The first end portion 70 is thinner transversely of the axial direction, circumferentially, at the axially extending region 76 than the remainder of the first end portion 70 to form the first hinge 52. The second end portion 72 is secured to the pylon 44 by fasteners 78, for example a bolted fastening or by welding, bonding, diffusion bonding etc. The second end portion 72 extends transversely relative to the first end portion 70. The second end portion 72 extends a greater distance in the circumferential direction than the axial direction. The second end portion 72 is thinner in the axial direction at the transversely extending region 80 than the remainder of the second end portion 72 to form the second hinge 54.

The first end portion 70 and the second end portion 72 are ends of a single member and thus form an integral structure. Alternatively the first end portion 70 and the second end portion 72 may be separate members and the second end portion 72 may be secured to the first end portion 70 by fasteners, for example a bolted fastening or by welding, bonding, diffusion bonding etc.

The second mounting 50 comprises a third hinge 56 adjacent the core engine casing 26 and a fourth hinge 58 adjacent the aircraft pylon 44. The third hinge 56 has a hinge line W arranged in a plane substantially perpendicular to the axis S of the gas turbine engine 10, the fourth hinge 58 has a hinge line Y arranged in a plane substantially perpendicular to the axis S of the gas turbine engine 10. The hinge lines W and Y are arranged substantially perpendicularly to the plane substantially vertically through and containing the axis S of the turbofan gas turbine engine 10. The hinge lines W and Y are parallel to each other and also parallel with the hinge line U. The second mounting 50 is configured and arranged such that in operation differential side bending of the second mounting 50 allows the second mounting 50 to act as a vertical hinge around a hinge line Z. The third hinge 56 and the fourth hinge 58 are elastic hinges. Thus in operation the second mounting 50 transmits vertical loads, side loads and torque loads from the core engine casing 24 to the aircraft pylon 44. It is also to be noted that the fourth hinge 58 is axially upstream of the third hinge 56.

The second mounting 50, as shown in FIG. 4, comprises a third end portion 90 and a fourth end portion 92. The third end portion 90 is secured to the core engine casing 26 by fasteners 94, for example a bolted fastening or by welding, bonding, diffusion bonding etc. The third end portion 90 comprises transversely spaced first and second limbs 96 and 98 arranged equi-distant from the plane vertically through and containing the axis S of the turbofan gas turbine engine 10. A third limb 100 extends diagonally to interconnect the radially inner end 102 of the first limb 96 and the radially outer end 108 of the second limb 98. The third end portion 90 extends substantially radially from and transversely of the core engine casing 26. The third end portion 90 is thinner in the axial direction at the axially extending regions 110 and 112 of the inner ends 102 and 106 of the first and second limbs 96 and 98 respectively than the remainder of the third end portion 90 to form the third hinge 56. The second limb 98 is sufficiently flexible in a transverse direction to accommodate radial thermal expansion of the downstream bearing housing 30. The fourth end portion 92 is secured to the pylon 44 by fasteners 114, for example a bolted fastening or by welding, bonding, diffusion bonding etc. The fourth end portion 92 extends parallel to the third end portion 90. The fourth end portion 90 is thinner in the axial direction at the transversely extending region 116 than the remainder of the fourth end portion 92 to form the fourth hinge 58. The limbs 96, 98 and 100 are dimensioned to avoid buckling under compressive loads. The fourth end portion 92 is secured to the pylon 44 at a different axial position to the position at which the third end portion 90 is secured to the core engine casing 26. In particular the fourth end portion 92 is secured to the pylon 44 axially upstream of the position at which the third end portion 90 is fastened to the core engine casing 26 such that the downstream second mounting 50 is arranged at a small angle to the radial direction.

The third end portion 90 and the fourth end portion 92 are ends of a single member and thus form an integral structure. Alternatively the third end portion 90 and the fourth end portion 92 may be separate members and the fourth end portion 92 may be secured to the third end portion 90 by fasteners, for example a bolted fastening or by welding, bonding, diffusion bonding etc.

The elastic hinges 52, 54, 56 and 58 are designed to control the elastic stresses and to minimise bending moments imparted to the adjoining core engine 24 and pylon 44 structures. The elastic hinges 52, 54, 56 and 58 work by elastic bending of the material of the hinges 52, 54, 56 and 58 within the fatigue limits of the material of the hinges 52, 54, 56 and 58. Thus the hinges 52, 54, 56 and 58 are joints which enable movement through small angles. The hinges 52, 54, 56 and 58 may be formed from suitable steel alloys, titanium alloys or higher temperature nickel alloys. For example the hinges 52 and 54 may be formed from an alloy comprising 6 wt % Al, 4 wt % V and the balance Ti plus impurities. The hinges 56 and 58 may be formed from an alloy comprising INCO718. The nominal composition of INCO 718 is 17 to 21 wt % Cr, 4.75 to 5.5 wt % Nb+Ta, 2.8 to 3.3 wt % Mo, 0.7 to 1.15 wt % Ti, 0.3 to 0.7 wt % Al, 0 to 1 wt % Co, 50 to 55 wt % Ni and the balance Fe and minor amounts of C, Si, Mn, P, S and impurities.

In addition to the first mounting 48 and second mounting 50, the primary mountings, failsafe mountings are provided. The failsafe mountings are arranged downstream of the first mounting 48 and second mounting 50. The failsafe mountings are of two-thirds the load carrying capacity of the first mounting 48 and the second mounting 50 respectively. The failsafe mountings are identical to the primary mountings but are turned through 180° about a vertical axis. The failsafe mountings are secured to the aircraft pylon 44 by bolts through thin insulating washers and are secured to the core engine casing 26 by bolts with a large clearance to electrically and mechanically isolate the failsafe mountings in normal operation. Electrical cables are attached to the failsafe mountings. In operation, if one of the first mounting 48 and second mounting 50 fails an electrical contact is produced to provide an indication that one or both of the first mounting 48 and second mounting 50 have failed.

An A-frame 60 extends between and interconnects the nacelle 42 and the core engine casing 26 adjacent the downstream bearing housing 30. The A-frame 60 is also in a plane containing the axis S of the turbofan gas turbine 10 and in a plane substantially vertically through the turbofan gas turbine engine 10 and is diametrically opposite the second mounting 50. The A-frame 60 comprises circumferentially spaced radially inner ends 62 and 64 and an outer end 66. The radially outer end 66 is at a different axial position to the radially inner ends 62 and 64 such that the A-frame is arranged at a small angle to the radial direction. The A-frame 60 has hinges 63 and 65 adjacent the core engine casing 26 and a hinge 67 adjacent the nacelle 42. The hinges 63 and 65 are coaxial and are arranged in a plane perpendicular to the axis S and the hinge 67 is arranged in plane perpendicular to the axis S. The hinges 63, 65 and 67 are parallel and the hinges 63, 65 and 67 are parallel to the third and fourth hinges 56 and 58. In particular the radially outer end 66 is axially upstream of the radially inner ends 62 and 64.

The angle of the second mounting 50 and the angle of the A-frame 60 are selected to match the axial and radial thermal and mechanical movements of the downstream bearing housing 30, so that there is no radial fight between the radially inner ends and the radially outer ends of the second mounting 50 and the A-frame 60.

Figure 5:
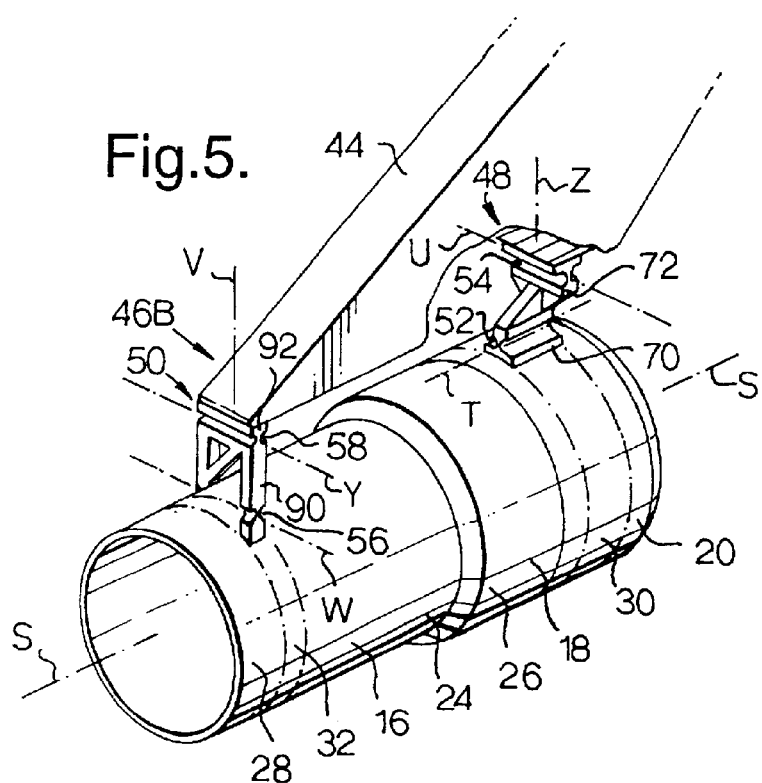
FIG. 5 is a perspective view of an alternative mounting arrangement shown in FIG. 1.

The mounting arrangement 46B shown in FIG. 5 is similar to the mounting arrangement 46 shown in FIG. 2, and like parts are denoted by like numerals. The mounting arrangement 46B differs in that the first mounting 48 is arranged adjacent the downstream bearing housing 30 and the second mounting 50 is arranged adjacent the upstream bearing housing 28. Additionally, the fourth hinge 58 is axially downstream of the third hinge 56.

Figure 6:
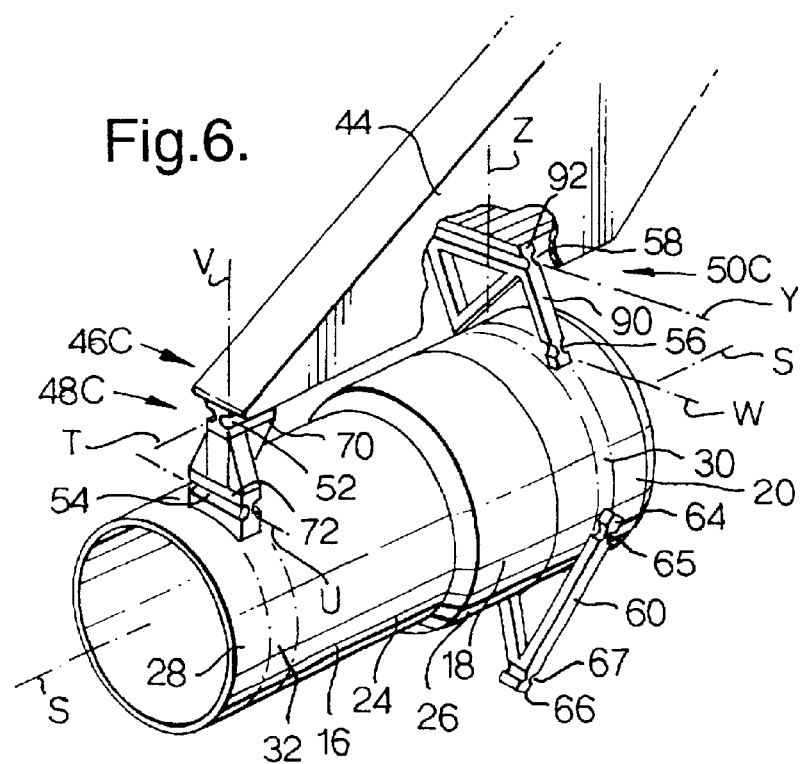
FIG. 6 is an enlarged perspective view of a further mounting arrangement shown in FIG. 1.

The mounting arrangement 46C shown in FIG. 6 is similar to the mounting arrangement 46 shown in FIG. 2, and like parts are denoted by like numerals. The mounting arrangement 46C differs in that the first hinge 52 of the first mounting 48C is adjacent the aircraft pylon 44 and the second hinge 54 of first mounting 48C is adjacent the core engine casing 26.

Figure 7:
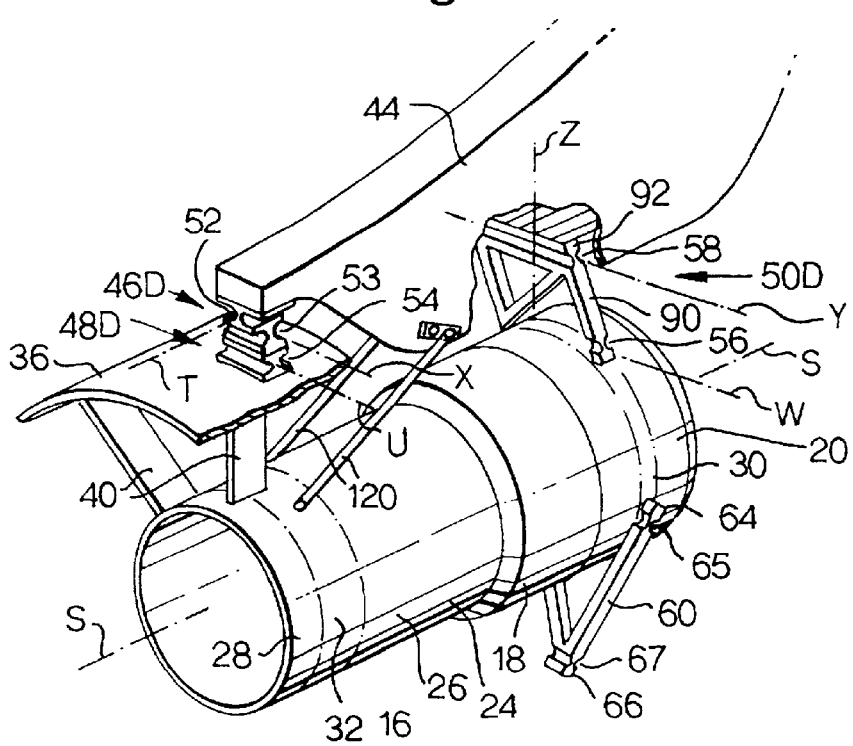
FIG. 7 is an enlarged perspective view of another mounting arrangement shown in FIG. 1.

The mounting arrangement 46D shown in FIG. 7 is similar to the mounting arrangement 46 shown in FIG. 2, and like parts are denoted by like numerals. The mounting arrangement 46D differs in that a first mounting 48D is provided on the fan casing 36, a second mounting 50D is provided on the core engine casing 26 and thrust struts 120 are provided between the upstream bearing housing 32 on the core engine casing 26 and the aircraft pylon 44.

Additionally the first mounting 48D comprises a first hinge 52 adjacent the aircraft pylon 44, a second hinge 54 adjacent the fan casing 36 and a fifth hinge 53 radially between the first hinge 52 and the second hinge 54. The first hinge 52 has a hinge line T arranged substantially parallel to the axis S of the gas turbine engine 10 to form a roll hinge. The second hinge 54 has a hinge line U arranged in a plane substantially perpendicular to the axis S of the gas turbine engine 10 to form a pitch hinge. The hinge line U is arranged substantially perpendicularly to the plane substantially vertically through the turbofan gas turbine engine 10. The fifth hinge 53 has a hinge line X arranged in a plane substantially perpendicular to the axis S of the gas turbine engine 10 to form a pitch hinge. The hinge line X is arranged substantially perpendicularly to the plane substantially vertically through the turbofan gas turbine engine 10 and parallel to the hinge line U. The second mounting 50D is identical to that shown in FIG. 2. The thrust struts 120 may comprise elastic hinges to allow a small degree of movement between the pylon 44 and thrust 120 and thrust strut 120 and core engine casing 26.

For the arrangement shown in FIG. 7, combined with an integral fan casing 36, nacelle 42 and pylon 44, the A-frame 60 isolates the core engine 24 from intake loads. The A-frame 60 loads are transmitted directly to the downstream bearing housing 30 and then to the second mounting 50, which acts as a second A-frame, and thus bending of the core engine 24 is avoided. The positioning of the A-frame 60 at this position reduces aerodynamic losses and increases the local structural stiffness of the nacelle 42. This increases the overall stiffness of the nacelle 42, pylon 44, turbofan gas turbine engine 10 and mounting arrangement 46 structure. The nacelle 42, A-frame 60 and second mounting 50 helps to maintain the core engine 24 straight and the core engine 24, A-frame 60 and second mounting 50 helps to maintain the nacelle 42 round.

Figure 8:
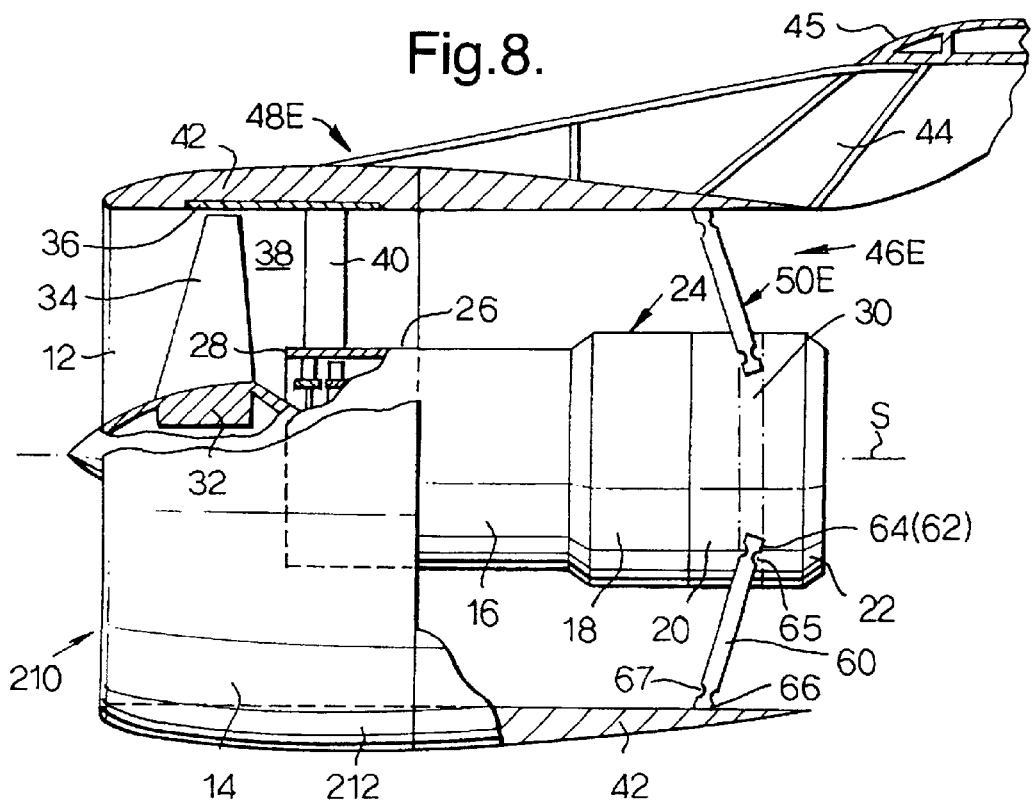
FIG. 8 shows a further turbofan gas turbine engine having a mounting arrangement according to the present invention.

A further mounting arrangement 46E shown in FIGS. 8 and 9, is similar to the mounting arrangement 46D shown in FIG. 7 and like parts are denoted by like numerals. The turbofan gas turbine engine 210 has an integral fan casing 36, nacelle 42 and pylon 44. The fan outlet guide vanes 40 transmit thrust from the core engine 24 to the nacelle 42, from the nacelle 42 to the aircraft pylon 44 and the aircraft wing 45. Thus the thrust struts and first mounting are eliminated. The nacelle 42 is continuous circumferentially with no breaks to impair its hoop strength. A thrust reverser 212 is positioned immediately downstream of the fan outlet guide vanes 40. The thrust reverser comprises conventional blocker doors and a translating cowl. The thrust reverser comprises relatively high radius and relatively short cascades of thrust reverser vanes and the thrust reverser vanes are arranged at angles of 45° in opposite directions to shear brace the apertures in the nacelle 42.

The mounting arrangement of the present invention has fewer parts and is thus simpler than the above-mentioned prior art. The mounting arrangement of the present invention is lighter in weight and cheaper to produce than the above-mentioned prior art. The mounting of the present invention provides continuity of structure type from the aircraft pylon to the bearing housings of the core engine.

Although the present invention has been described with reference to a turbofan gas turbine engine, it is equally possible to apply the invention to a turbojet or a turboprop engine.

Although the present invention has been described with reference to all the mountings comprising elastic hinges, it may be possible to use one or more elastic hinges in combination with conventional mountings.

The aircraft pylon may be a pylon of the type which extends up or down from an aircraft wing or it may be a pylon of the type which extends from the aircraft fuselage, for example a stub pylon which extends sideways from the aircraft fuselage. The pylon may be embedded in, or form part of the, aircraft wing.

Each mounting comprising elastic hinges may comprise one or more members extending longitudinally of the mounting. Each of the members forming the mounting may comprise one or more elastic hinges. The members may be stacked so that the elastic hinges in the members are arranged to define the elastic hinge or elastic hinges of the mounting.

What is claimed is:

1. A mounting arrangement for mounting a gas turbine engine on an aircraft, the gas turbine engine having at least one casing, the mounting arrangement comprising at least one mounting for mounting the at least one casing on the aircraft, the mounting comprising at least one elastic hinge arranged in one position which is one of being parallel to the axis of the gas turbine engine or in a plane perpendicular to the axis of the gas turbine engine, the at least one elastic hinge being arranged to allow small elastic movements of the mounting within the fatigue limits of the material of the mounting, said elastic hinge comprising an end portion for attachment to the aircraft, said end portion including a portion having a thickness that is reduced relative to said end portion to define a hinge having an axis about which relative movement can take place at least when said elastic hinge is subject to loading above a selected limit within the fatigue limits of the mounting.

2. A mounting arrangement as claimed in claim 1 wherein the at least one mounting comprises a first hinge arranged parallel to the axis of the gas turbine engine and a second hinge arranged in a plane perpendicular to the axis of the gas turbine engine.

3. A mounting arrangement as claimed in claim 1 wherein the mounting comprises a first hinge arranged parallel to the axis of the gas turbine engine, a second hinge arranged in a plane perpendicular to the axis of the gas turbine engine and a third hinge arranged in a plane perpendicular to the axis of the gas turbine engine.

4. A mounting arrangement as claimed in claim 1 wherein the mounting comprises a first hinge arranged in a plane perpendicular to the axis of the gas turbine engine and a second hinge arranged in a plane perpendicular to the axis of the gas turbine engine.

5. A mounting arrangement as claimed in claim 1 wherein the gas turbine engine comprises a core engine having a core engine casing, the mounting arrangement comprises a first mounting for mounting the core engine casing on the aircraft and a second mounting for mounting the core engine casing on the aircraft, the first mounting comprises a first hinge and a second hinge, the first hinge is arranged parallel to the axis of the gas turbine engine to form a roll hinge, the second hinge is arranged in a plane perpendicular to the axis of the gas turbine engine to form a pitch hinge, the second mounting comprises a third hinge adjacent the core engine casing and a fourth hinge adjacent the aircraft, the third hinge is arranged in a plane perpendicular to the axis of the gas turbine engine, the fourth hinge is arranged in a plane perpendicular to the axis of the gas turbine engine and the hinges are elastic hinges.

6. A mounting arrangement as claimed in claim 5 wherein the first mounting is an upstream mounting and the second mounting is a downstream mounting.

7. A mounting arrangement as claimed in claim 5 wherein the first mounting is a downstream mounting and the second mounting is an upstream mounting.

8. A mounting arrangement as claimed in claim 6 wherein the upstream mounting is adjacent an upstream bearing housing and the downstream mounting is adjacent a downstream bearing housing.

9. A mounting arrangement as claimed in claim 1 wherein the gas turbine engine is a turbofan gas turbine engine.

10. A mounting arrangement as claimed in claim 9 wherein the turbofan gas turbine engine comprises a nacelle arranged substantially coaxially with the core engine.

11. A mounting arrangement as claimed in claim 10 wherein an A-frame connects the core engine casing and the nacelle, the A-frame and the second mounting are arranged in a substantially vertical plane containing the engine axis.

12. A mounting arrangement as claimed in claim 11 wherein the A-frame is arranged at an angle such that the radially inner end of the A-frame is at a different axial position to the radially outer end of the A frame.

13. A mounting arrangement as claimed in claim 5 wherein the second mounting is arranged at an angle such that the radially inner end of the second mounting is at a different axial position to the radially outer end of the second mounting.

14. A mounting arrangement as claimed in claim 2 wherein the first mounting and the second mounting are mounted on a pylon of the aircraft.

15. A mounting arrangement as claimed in claim 14 wherein the pylon extends from a wing of the aircraft or extends from a fuselage of the aircraft.

16. A mounting arrangement for mounting a gas turbine engine having a longitudinal axis, on an aircraft, the gas turbine engine having at least one casing, the mounting arrangement comprising at least one mounting for mounting the at least one casing on the aircraft, the mounting comprising at least one elastic hinge arranged in one position which is one of being parallel to the axis of the gas turbine engine or in a plane perpendicular to the axis of the gas turbine engine, the at least one elastic hinge being arranged to allow small elastic movements of the mounting within the fatigue limits of the material of the mounting, said elastic hinge comprising an end portion for attachment to the aircraft, said end portion having a selected thickness and including a portion having a thickness that is reduced relative to said selected thickness of said end portion to define a hinge having an axis about which relative movement can take place at least when said elastic hinge is subject to loading above a selected limit within the fatigue limits of the mounting, said reduced thickness portion of said hinge including a U shaped surface portion facing away from said hinge axis and extending transverse to the axis of the gas turbine engine.

17. The invention as claimed in claim 16 wherein said hinge includes another U shaped portion facing in a direction opposite said first mentioned U shaped portion.

\* \* \* \* \*